United States Patent
Yang et al.

(10) Patent No.: US 10,626,260 B2
(45) Date of Patent: *Apr. 21, 2020

(54) SEMICONDUCTIVE COMPOSITION FOR CABLE

(71) Applicant: DYM SOLUTION CO., LTD., Cheonan-si, Chungcheongnam-do (KR)

(72) Inventors: Jong Seok Yang, Cheonan-si (KR); Ki Joung Lee, Cheonan-si (KR); Geun Bae Jeon, Cheonan-si (KR); Dong Ha Park, Seoul (KR)

(73) Assignee: DYM SOLUTION CO., LTD., Cheonan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,725

(22) Filed: Aug. 2, 2018

(65) Prior Publication Data

US 2019/0040244 A1 Feb. 7, 2019

(30) Foreign Application Priority Data

Aug. 4, 2017 (KR) .................. 10-2017-0098787
Jul. 27, 2018 (KR) .................. 10-2018-0087827

(51) Int. Cl.
| | |
|---|---|
| *H01B 1/24* | (2006.01) |
| *C08L 23/00* | (2006.01) |
| *C08L 23/12* | (2006.01) |
| *H01B 13/24* | (2006.01) |
| *C08L 23/08* | (2006.01) |
| *H01B 9/02* | (2006.01) |

(52) U.S. Cl.
CPC .............. *C08L 23/12* (2013.01); *H01B 1/24* (2013.01); *H01B 13/24* (2013.01); *C08L 23/0869* (2013.01); *C08L 2203/202* (2013.01); *C08L 2205/025* (2013.01); *C08L 2205/03* (2013.01); *H01B 9/027* (2013.01)

(58) Field of Classification Search
CPC .... H01B 1/00; H01B 1/24; H01B 9/02; C08L 23/025; C08L 25/02
See application file for complete search history.

(56) References Cited

U.S. PATENT DOCUMENTS

| | | | |
|---|---|---|---|
| 10,308,794 B2* | 6/2019 | Steffl | ................ C08L 23/10 |
| 2013/0133922 A1* | 5/2013 | Steffl | ................ C08L 23/14 174/120 SC |
| 2015/0004411 A1* | 1/2015 | Malik | ................ C08L 23/0853 428/375 |

FOREIGN PATENT DOCUMENTS

| KR | 10-2012-0048520 A | 5/2012 |
|---|---|---|
| KR | 10-2014-0126993 A | 11/2014 |

* cited by examiner

*Primary Examiner* — Mark Kopec
(74) *Attorney, Agent, or Firm* — Knobbe Martens Olson & Bear LLP

(57) ABSTRACT

Provided is a semiconductive resin composition which may be used for both an internal semiconductive layer and an external semiconductive layer of a power cable, and in particular has excellent peelability to be used for the external semiconductive layer. In addition, a novel semiconductive resin composition having improved thermal resistance and mechanical physical properties, and an improved deterioration property is provided. The semiconductive resin composition for a power cable includes: 20 to 70 parts by weight of any one or two or more conductive particles selected from the group consisting of carbon black, graphite and graphene, based on 100 parts by weight of a composite resin including a polypropylene homopolymer having a melting point of 150 to 170° C. and an ethylene-(meth)acrylate-based resin.

9 Claims, No Drawings

SEMICONDUCTIVE COMPOSITION FOR CABLE

CROSS-REFERENCE TO RELATED APPLICATIONS

This application claims priority under 35 U.S.C. § 119 to Korean Patent Application No. 10-2017-0098787, filed on Aug. 4, 2017, Korean Patent Application No. 10-2018-0087827, filed on Jul. 27, 2018, in the Korean Intellectual Property Office, the disclosure of which is incorporated herein by reference in its entirety.

TECHNICAL FIELD

The following disclosure relates a semiconductive resin composition used for a semiconductive layer of a power cable. More particularly, the following disclosure relates to a semiconductive resin composition which may be used for an external semiconductive layer as well as an internal semiconductive layer.

BACKGROUND

In a power cable, a semiconductive layer is formed between a conductive layer and an insulating layer, thereby manufacturing a cable having excellent electrical properties. Examples thereof are disclosed in KR 10-2012-0048520 A and KR 10-2014-0126993 A.

SUMMARY

In a common semiconductive layer, a product obtained by crosslinking a mixture of a polyolefin such as polyethylene and carbon black which is a conductive inorganic particle is used. When polypropylene is used, a metal deactivating additive for preventing deterioration by contact with a metal (conductor) is used.

In the case that a common semiconductive material is used for an external semiconductive layer, when a cable is connected, peelability is not sufficient for peeling off the external semiconductive layer, and connecting the cable, and thus, there is inconvenience for substantially using the material as the external semiconductive layer, and there occur surface unevenness and irreproducibility due to crosslinking, and a protrusion due to reduced dispersibility of conductive powder. Therefore, there is currently needed to develop a composition having excellent peelability and a power cable using the same.

In addition, there is needed to develop a semiconductive resin composition which may retain an excellent elongation, and may be recycled in various uses, by preventing deterioration by metal in a high temperature degradation test.

In addition, a rate of increase in volume resistivity at a high temperature is considerably reduced, and thus, there is needed a novel semiconductive composition having considerably stabilized dependence of volume resistivity on temperature. Therefore, in a power cable, there is needed to develop a novel resin composition which may have adjustable peelability to be used for the internal/external semiconductive layer, and may also further prevent deterioration.

An embodiment of the present invention is directed to providing a novel semiconductive resin composition for a cable having improved peelability.

Another embodiment of the present invention is directed to providing a non-crosslinkable semiconductive layer, and a semiconductive resin composition having substantially no or greatly decreased protrusions formed on the surface, even in the case of using an excessive amount of conductive particles.

Another embodiment of the present invention is directed to providing a semiconductive resin composition having complex effects of easily adjusting peelability, simultaneously with improving mechanical physical properties, by using a polypropylene resin having a certain melting point.

Another embodiment of the present invention is directed to providing a semiconductive resin composition which may have a significantly reduced increase in volume resistivity at a high temperature to minimize change in dependence of volume resistivity on temperature, minimize change in resistance following long-term use, prevent accelerated aging, and have excellent stretch retention and tensile retention after heating.

Another embodiment of the present invention is directed to providing a recyclable semiconductive resin composition which prevents aging caused by metal to have excellent mechanical physical properties such as an elongation following long-term use.

Yet another embodiment of the present invention is directed to providing a semiconductive resin composition which has improved processing properties and may prevent warping of a cable surface even after manufacturing the cable.

Various aspects of the present invention provide a composition which may be used for an internal semiconductive layer and an external semiconductive layer of a power cable having various structures such as a conductive layer, an internal semiconductive layer, an insulating layer, an external semiconductive layer and a sheath layer.

In one general aspect, a semiconductive resin composition for a cable includes: 20 to 70 parts by weight of any one or two or more conductive particles selected from the group consisting of carbon black, graphite and graphene, based on 100 parts by weight of a composite resin including a polypropylene homopolymer having a melting point of 150 to 170° C. and an ethylene-(meth)acrylate-based resin.

In another general aspect, a cable includes a semiconductive layer manufactured by extruding the semiconductive composition.

The composition according to various exemplary embodiments has advantages of allowing peelability to be adjusted to be used for an external semiconductive layer as well as an internal semiconductive layer, and satisfying various required physical properties.

In addition, the composition according to various exemplary embodiments of the present invention may provide a composition solving the problem of inferior processability due to the use of conventional polypropylene having a high melting point, and fundamentally decreasing a carbonated spot which may occur sometimes at the time of processing, thereby minimizing change in the physical properties due to processing conditions.

In addition, the composition according to various exemplary embodiments of the present invention may provide a recyclable semiconductive resin composition which prevents aging caused by metal to have excellent mechanical physical properties such as an elongation following long-term use.

In addition, the composition according to various exemplary embodiments of the present invention further improves deterioration following the long-term use at high voltage, thereby providing an advantage of minimizing brittleness due to degradation of physical properties and elasticity following long-term use, so that the physical properties may be retained at the time of reuse.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in more detail by the following specific examples or exemplary embodiments. However, the following specific examples and exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains, the terms used herein are only for effectively describing a certain exemplary embodiment, and not intended to limit the present invention.

In addition, the singular form used in the specification and claims appended thereto may be intended to also include a plural form, unless otherwise indicated in the context.

An exemplary embodiment of the present invention is a semiconductive resin composition for a cable including: 20 to 70 parts by weight of any one or two or more conductive particles selected from the group consisting of carbon black, graphite and graphene, based on 100 parts by weight of a composite resin including a polypropylene homopolymer having a melting point of 150 to 170° C. and an ethylene-(meth)acrylate-based resin.

In an exemplary embodiment, the composite resin may include 10 to 250 parts by weight of the ethylene-(meth)acrylate-based resin, based on 100 parts by weight of the polypropylene homopolymer.

In an exemplary embodiment, the composite resin may further include 1 to 100 parts by weight of an olefinic elastomer, based on 100 parts by weight of the polypropylene homopolymer.

In an exemplary embodiment, the polypropylene homopolymer may have a melt index of 0.05 to 50 g/10 min, as measured under the condition of 230° C. and 2.16 kg.

In an exemplary embodiment, an ethylene-(meth)acrylate copolymerized resin may have a melt index of 0.1 to 20 g/10 min, as measured under the condition of 190° C. and 2.16 kg.

In an exemplary embodiment, the ethylene-(meth)acrylate-based resin may include 50 to 99 weight % of a unit derived from an ethylene monomer and 1 to 50 weight % of a unit derived from a (meth)acrylate-based monomer.

In an exemplary embodiment, the olefinic elastomer may be any one or two or more selected from the group consisting of ethylene-propylene-diene-based elastomers and a styrene and olefin copolymer-based elastomers.

In an exemplary embodiment, a blend of the polypropylene homopolymer and the olefinic elastomer may have a melt index of 0.1 to 20 g/10 min, as measured under the condition of 230° C. and 2.16 kg.

In an exemplary embodiment, 0.1 to 5 parts by weight of an aliphatic polyamide resin may be further included, based on 100 parts by weight of the composite resin.

Another exemplary embodiment of the present invention is a cable having a semiconductive layer manufactured by extruding the semiconductive composition.

Since the semiconductive resin composition according to various exemplary embodiments of the present invention may have adjustable adhesion so as to have peelability with an insulating layer, there is provided a novel composition which particularly imparts a peeling property, thereby being used for an external semiconductor layer requiring a peeling operation when connecting a cable, and also a non-peelable one may be used for an internal semiconductive layer.

The semiconductive resin composition according to various exemplary embodiments of the present invention further includes an olefinic elastomer, thereby having improved processing properties, and relieving stress of a semiconductive layer to prevent warping of a cable surface even after the cable is manufactured, which is more preferred. In addition, there is provided an effect of significantly increasing surface smoothness.

In various exemplary embodiments of the present invention, when the olefinic elastomer is further included, a blend of the polypropylene homopolymer and the olefinic elastomer may be used, and in this case, it is more preferred to prepare beforehand the blend of the polypropylene homopolymer and the elastomer which is then formed into a pellet, or a commercialized product which was prepared beforehand with elastic polypropylene to have elasticity in a reactor may be used instead. Accordingly, among the terms of the present application, a blend of the polypropylene homopolymer and the olefinic elastomer may be used to have a concept to include the commercialized product also.

Hereinafter, the components adopted in various exemplary embodiments of the present invention will be described in detail.

First, the polypropylene homopolymer will be described.

The polypropylene homopolymer may be a stereoregular homopolymer having excellent crystallinity.

In an exemplary embodiment, the polypropylene homopolymer has a melting point of 150 to 170° C., more specifically 155 to 165° C., and within the melting point range, stereoregularity with excellent crystallinity is possessed, which is thus preferred. In addition, within the range, peelability and adhesion with the insulating layer may be adjusted, which is thus preferred. In addition, within the range, a change in volume resistivity at a high temperature is small, mechanical physical properties such as tensile strength and a stretch ratio are excellent, and surface smoothness is excellent, which is thus preferred. In addition, the range is more preferred, since compatibility with the ethylene-(meth)acrylate-based copolymer and the olefinic elastomer is excellent, and mechanical physical properties such as tensile strength is excellent.

In addition, it is preferred that the MI (melt index) of the polypropylene homopolymer is 0.05 to 50 g/10 min at 230° C. and 2.16 kg, and it is not limited when the MI satisfies 0.05 to 50 g/10 min. The melt index is measured in accordance with ASTM D 1238.

In embodiments, under the conditions of 230° C. and 2.16 kg, the melt index of polypropylene homopolymer is 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 49.5 or 50 g/10 min. The melt index of the polypropylene may be in a range formed by any two numbers selected from those listed in the proceeding sentence. In addition, when the polypropylene homopolymer according to various exemplary embodiments of the present invention is blended with the following olefinic elastomer, it is preferred that the melt index of the blend satisfies 0.1 to 20 g/10 min (230° C. and 2.16 kg), since processability, warping to stress, or the like is excellent, and thus, when the cable is manufactured and stored for a long time, atypical bending of the cable is not formed. In addition, there is an effect of significantly increasing surface smoothness. At the same time, there is an effect of maintaining elongation retention and mechanical strength.

Next, the ethylene-(meth)acrylate-based resin will be described.

In an exemplary embodiment, the ethylene-(meth)acrylate-based resin may include 50 to 99 weight %, more specifically 80 to 95 weight % of a unit derived from an ethylene monomer, and 1 to 50 weight %, more specifically 5 to 20 weight % of a unit derived from a (meth)acrylate-based monomer. That is, the ethylene-(meth)acrylate-based resin may be produced by polymerizing 50 to 99 weight % of an ethylene monomer and 1 to 50 weight % of a (meth)acrylate-based monomer.

In embodiments, the ethylene-(meth)acrylate-based resin includes the unit derived from the ethylene monomer in an amount of 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 weight %. In embodiments, the amount of the unit derived from the ethylene monomer in the ethylene-(meth)acrylate-based resin is in a range formed by any two numbers selected from those listed in the proceeding sentence. In embodiments, the ethylene-methacrylate-based resin includes the unit derived from the (meth)acrylate-based monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 weight %. In embodiments, the amount of the units derived from the (meth)acrylate-based monomer in the ethylene-(meth)acrylate-based resin is in a range formed by any two numbers selected from those listed in the proceeding sentence.

It is preferred to maintain a content of the (meth)acrylate-based monomer within the range, since flowability is excellent, and compatibility with the polypropylene homopolymer and the elastomer is increased to increase mechanical physical properties. In addition, it is possible to adjust peelability to an insulating layer of a cable, specifically, an insulating layer including the polypropylene-based resin or the polypropylene-based resin and the olefinic elastomer, and thus, the composition may be used for the external semiconductive layer as well as the internal semiconductive layer.

An example of the (meth)acrylate-based monomer is preferably alkyl (meth)acrylates such as ethyl acrylate, ethyl methacrylate, propyl acrylate, propyl methacrylate, n-butyl acrylate, n-butyl methacrylate, methyl methacrylate, methyl acrylate, and more preferably C2 to C6 alkyl (meth)acrylate monomers, in the sense of imparting flexibility or mechanical physical properties and deterioration prevention properties. In the present application, the (meth)acrylate-based monomer refers to an acrylate-based or methacrylate-based monomer.

In an exemplary embodiment, the ethylene-(meth)acrylate-based resin may be the resin using ethylene ethyl acrylate, and by mixing the resin with a propylene homopolymer, a change in volume resistivity at a high temperature is small, thereby minimizing the change in resistance following long-term use.

In various exemplary embodiments of the present invention, the ethylene-(meth)acrylate copolymerized resin is not significantly limited, however, for example, it is more preferred that the MI is 0.1 to 20 g/10 min under the condition of 190° C. and 2.16 kg for flowability or thermal stability and compatibility, and also better surface uniformity of the manufactured cable. In embodiments, under the conditions of 190° C. and 2.16 kg, the melt index of the ethylene-(meth)acrylate copolymer resin is 0.1, 0.2, 0.3, 0.4, 0.5, 0.6, 0.7, 0.8, 0.9, 1, 2, 3, 4, 5, 6, 7, 8, 8.5, 9, 9.5, 10, 10.5, 11, 11.5, 12, 13, 14, 15, 16, 17, 18, 19 or 20 g/10 min. In one embodiment, the melt index of the ethylene-(meth)acrylate copolymer resin is in a range formed by any two numbers selected from those listed in the proceeding sentence.

It is preferred that the content of the ethylene-(meth)acrylate copolymerized resin is 10 to 250 parts by weight, preferably 50 to 200 parts by weight, more preferably 60 to 150 parts by weight, based on 100 parts by weight of the polypropylene homopolymer. In addition, as the content of the ethylene-(meth)acrylate copolymerized resin is increased, peelability is significantly improved, and thus, the resin is suitable for being used as the material of the external semiconductive layer. More specifically, for increasing the peelability, 100 to 250 parts by weight may be used, based on 100 parts by weight of the polypropylene homopolymer.

In embodiments, the composition includes the ethylene-(meth)acrylate copolymer resin in an amount of 10, 15, 20, 25, 30, 35, 40, 45, 50, 55, 60, 65, 70, 75, 80, 85, 90, 92, 95, 97, 100, 102, 105, 108, 110, 112, 115, 117, 120, 122, 123, 124, 125, 128, 130, 132, 134, 135, 136, 137, 137.5, 138, 140, 142, 145, 148, 150, 152, 155, 158, 160, 165, 170, 175, 180, 185, 190, 195, 196, 197, 198, 199, 200, 201, 201, 203, 204, 205, 206, 207, 208, 210, 215, 220, 225, 230, 235, 240, 245 or 250 parts by weight, based on 100 parts by weight of polypropylene. In one embodiment, the ethylene-(meth)acrylate copolymer resin is included in an amount in a range formed by any two numbers selected from those listed in the proceeding sentence.

Next, the olefinic elastomer will be described.

In an exemplary embodiment of the present invention, the olefinic elastomer may refer to an ethylene-propylene-diene-based resin or a styrene and olefin copolymer-based elastomer.

An ethylene-α-olefin-diene resin refers to an ethylene propylene diene monomer (EPDM), representatively, and has thermal stability and electrical properties, thereby having a characteristic of being variously used for industrial components.

The EPDM resin may include 30 weight % to 80 weight %, more specifically 40 weight % to 80 weight % of an ethylene unit, 20 weight % to 60 weight % of an α-olefin unit, and 0 weight % to 10 weight % of a diene unit. The α-olefin unit may be branched, straight chain or cyclic α-olefin unit having 3 to 18 carbon atoms, and may be for example, propylene, 1-butene, 1-pentene, 3-methyl-1-butene, 1-hexene, 3-methyl-1-pentene, 4-methyl-1-pentene, 1-heptene, 3-methyl-1-hexene, 4-metehyl-1-hexene, 5-methyl-1-hexene, 3-ethyl-1-pentene, 1-octene, 3-methyl-1-heptene, 4-methyl-1-heptene, 5-methyl-1-heptene, 6-methyl-1-heptene, 3-ethyl-1-hexene, 4-ethyl-1-hexene, 3-propyl-1-pentene, 1-decene, and the like.

In addition, in various exemplary embodiments of the present invention, as the olefinic elastomer, styrene ethylene butylene styrene (SEBS) may be representatively used, SEBS being an elastic body having an ethylene-butylene polymer or a butylene polymer part as a soft segment between a polystyrene part as a hard segment, and other elastomers in various forms, for example, styrene butadiene styrene (SBS), styrene isoprene styrene (SIS), SEBS, styrene ethylene propylene styrene (SEPS) available from Kraton, or a blend thereof may be included, but not limited thereto.

In addition, the composition according to various exemplary embodiments of the present invention includes the olefinic elastomer, thereby further improving deterioration occurring after the long-term use to provide an advantage of minimizing cracks or a brittle change of the semiconductive layer of the cable following long-term use, so that the physical properties may be retained at the time of reuse.

Next, the conductive particle used in various exemplary embodiments of the present invention is not significantly limited as long as the particle has a conductive property, however, for example, carbon particles such as carbon black, graphite and graphene may be exemplified, and any one or a mixture of two or more selected from the group consisting thereof may be used.

In an exemplary embodiment, the conductive particle may have a surface area of 20 to 1,500 m²/g. In embodiments, electrically conductive particles have surface areas of 20, 30, 40, 50, 60, 70, 75, 80, 90, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or 1500 m²/g. The surface areas may be in a range formed by any two numbers selected from those listed in the proceeding sentence.

In addition, the content of the conductive particle may be 20 to 70 parts by weight, based on 100 parts by weight of the composite resin. In various exemplary embodiments of the present invention, as the semiconductive resin composition uses the composite resin obtained by mixing the polypropylene homopolymer having a melting point of 150 to 170° C. and the ethylene-(meth)acrylate-based resin, even in the case of using the conductive particle in a large amount of 20 parts by weight or more, an effect of having excellent volume resistivity at a high temperature and mechanical physical properties may be provided.

In embodiments, the composition includes electrically conductive particles in an amount of 20, 25, 30, 35, 38, 40, 41, 42, 43, 44, 45, 46, 47, 48, 49, 50, 52, 55, 60, 65 or 70 parts by weight, based on 100 parts by weight of the composite resin. In one embodiment, the ethylene-(meth)acrylate copolymer resin is included in an amount in a range formed by any two numbers selected from those listed in the proceeding sentence.

Next, the aliphatic polyamide resin will be described.

The semiconductive resin composition according to an exemplary embodiment of the present invention further includes the aliphatic polyamide resin, thereby preventing deterioration by metal such as a cable to maintain a better elongation, and having physical properties of lower volume resistivity at a high temperature to prevent accelerated aging due to a change in resistance following long-term use.

It is preferred that the aliphatic polyamide resin to be used has a melting point of 170 to 180° C. for compatibility with the composite resin, and more specifically, for example, nylon 11, nylon 12, or the like having a melting point of 170 to 180° C. may be used. Otherwise, it is also possible to use a terpolymer or a tetrapolymer selected from the group consisting of nylon 6, nylon 66, nylon 4, nylon 11, nylon 12, and the like.

The content of the aliphatic polyamide resin to be used may be 0.1 to 5 parts by weight, more specifically 0.5 to 2 parts by weight, based on 100 parts by weight of the composite resin, and within the range, it is sufficient to achieve the effect of further lowering deterioration by metal and volume resistivity at a high temperature.

In various exemplary embodiment of the present invention, a preparation method of the semiconductive resin composition for a cable is not particularly limited.

For example, the semiconductive resin composition may be prepared by kneading 20 to 70 parts by weight of any one or two or more conductive particles selected from the group consisting of carbon black, graphite and graphene, based on 100 parts by weight of a composite resin including the polypropylene homopolymer having a melting point of 150 to 170° C. and the ethylene-(meth)acrylate-based resin, at about 150 to 230° C. for about 5 to 15 minutes, using a mixing roll.

The semiconductive composition may be stirred using a kneader mixer, a dispersion kneader, a buss kneader, a twin screw extender, or the like, for uniformly dispersing the carbon black in the base resin.

In addition, though it is not particularly limited in the present invention, common viscosity controlling agents, UV protection agents, antioxidants, releasing agents, lubricants and inorganic additives may be used within a range of not damaging the nature of the present invention, but a detailed description will be omitted.

Hereinafter, the present invention will be described in detail by the Examples of the present invention. In the present invention, the exemplary embodiments are not limited to the Examples, and may be carried out by being modified in various forms within the scope of the technical idea, and thus, the present invention is not limited to the Examples, and the Examples are only provided as an auxiliary means which may deliver the technical idea of the present invention well.

EXAMPLES 1 TO 5, AND COMPARATIVE EXAMPLES 1 TO 6

In the Examples and the Comparative Examples of the present invention, the components having the composition ratios described in the following Table 1 were mixed and extruded to evaluate a specimen, and when the olefinic elastomer was adopted in the following Example, a pellet prepared by blending beforehand the polypropylene homopolymer and the elastomer was used. The physical properties thereof were measured, and the results are listed in Table 1.

Each composition component used in the following Table 1 is as follows:

The polypropylene homopolymer (Homo-PP) was a polypropylene homopolymer having a melt index of 5 g/10 min, as measured in accordance with ASTM D 1238 under the condition of 230° C. and 2.16 kg, and a melting point of 161° C.

The polypropylene random copolymer (Random-PP) was a polypropylene resin having a melt index of 5 g/10 min, as measured in accordance with ASTM D 1238 under the condition of 230° C. and 2.16 kg, and a melting point of 145° C.

Polyethylene (PE) was polyethylene having a melt index of 5 g/10 min, as measured in accordance with ASTM D 1238 under the condition of 190° C. and 2.16 kg, and a melting point of 135° C.

An olefinic elastomer (OE) was an ethylene propylene-diene terpolymer, and Suprene S501A available from SK Global Chemical Co., Ltd., was used.

Ethylene-ethyl acrylate (EEA) was an ethylene-ethyl acrylate resin having a melt index of 10 g/10 min, as measured in accordance with ASTM D 1238 under the condition of 190° C. and 2.16 kg, and a content of ethyl acrylate of 17 weight %.

Ethylene-vinyl acetate (EVA) was an ethylene-vinyl acetate resin having a melt index of 12 g/10 min, as measured in accordance with ASTM D 1238 under the condition of 190° C. and 2.16 kg, and a content of vinyl acetate of 15 weight %.

Polyamide (PA) was an aliphatic polyamide resin, and used nylon 12 having a melting point of 180° C.

It was found from the above Examples and Comparative Examples that the composition according to various exemplary embodiments of the present invention overall had low volume resistivity, so that the composition may be sufficiently used for the semiconductive material of a cable, had an excellent tensile strength-elongation property, and also had excellent tensile strength retention and stretch retention after heating.

In particular, the composition according to various exemplary embodiments has excellent peelability while satisfying the physical properties, and also allows peeling adjustment, and the peelable composition may be used for the external semiconductive material, and the non-peelable composition may be used for the internal semiconductive material.

In addition, it was found that since the composition is not significantly influenced by the volume resistivity depending on temperature, accelerated aging due to change in resistance following long-term use is prevented, and also other physical properties are excellent while improving the peelability, for example, the stretch ratio or the tensile retention after aging both exceeds 80%, more preferably 90%.

TABLE 1

| Composition component | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Composite resin | Homo-PP | 90 | 30 | 65 | 65 | 65 | 100 | 95 | 65 | — | — | — |
| | Random-PP | — | — | — | — | — | — | — | — | — | 90 | 65 |
| | PE | — | — | — | — | — | — | — | — | 90 | — | — |
| | OE | — | 10 | 5 | 5 | 5 | — | 5 | 5 | — | — | 5 |
| | EEA | 10 | 60 | 30 | 30 | 30 | — | — | — | 10 | 10 | 30 |
| | EVA | — | — | — | — | — | — | — | 30 | — | — | — |
| | Total (part by weight) | 100 | 100 | 100 | 100 | 100 | 100 | 100 | 100 | 100 | 100 | 100 |
| PA (part by weight) | | — | — | — | — | 0.5 | — | — | — | — | — | — |
| Carbon black (75 m$^2$/g) (part by weight) | | 45 | 45 | 45 | 45 | 45 | 45 | 45 | 45 | 45 | 45 | 45 |
| Deterioration inhibitor(*1) (part by weight) | | 0.5 | 0.5 | 0.5 | — | 0.5 | 0.5 | 0.5 | 0.5 | 0.5 | 0.5 | 0.5 |
| Antioxidant(*2) (part by weight) | | 1.5 | 1.5 | 1.5 | 2.0 | 1.5 | 1.5 | 1.5 | 1.5 | 1.5 | 1.5 | 1.5 |
| Volume resistivity (Ω · cm)(*3) | 23° C. | 6 | 8 | 7 | 6 | 5 | 18 | 37 | 27 | 40 | 20 | 23 |
| | 110° C. | 88 | 92 | 83 | 103 | 75 | 214 | 228 | 239 | 425 | 245 | 288 |
| | 130° C. | 72 | 88 | 79 | 121 | 63 | 203 | 211 | 221 | 665 | 238 | 281 |
| Room temperature(*4) | Tensile strength (N/mm$^2$) | 14.2 | 14.1 | 14.0 | 14.3 | 15.1 | 13.5 | 13.2 | 13.0 | 11.7 | 12.1 | 12.4 |
| | Stretch ratio (%) | 492 | 489 | 479 | 467 | 510 | 423 | 432 | 398 | 352 | 345 | 384 |
| After heating (150° C., 168 hrs)(*5) | Tensile retention (%) | 98 | 96 | 97 | 86 | 99 | 83 | 85 | 82 | Fail | Fail | Fail |
| | Stretch retention (%) | 96 | 92 | 95 | 82 | 99 | 82 | 83 | 80 | Fail | Fail | Fail |
| Degree of peeling(*6) | X: not peeled ○: peelable | X | ○ | X | X | X | X | X | X | X | X | X |
| Surface smoothness (0.05~0.10 mm)(*7) | (Protrusion width, number) EA/1 cm$^2$ | 2 | 0 | 1 | 1 | 0 | 11 | 15 | 8 | 8 | 13 | 9 |
| Warping(*8) | X: warping ○: no warping | X | ○ | ○ | ○ | ○ | X | ○ | ○ | X | X | ○ |

(*1)Deterioration inhibitor: 2',3-bis[3-(3,5-di-tert-butyl-4-hydroxyphenyl)propionyl] propionohydrazide
(*2)Antioxidant: a quantitative mixture of tetrakismethylene(3,5-di-t-butyl-4-hydroxyhydrocinnamate)methane/2,2'-Thio-bis(ethyl-β-3,5-di-tert-butyl-4-hydroxyphenyl)propionate/Dioctadecyl 3,3'-thiodipropionate (a weight ratio of 1:1:1)
(*3)Measured in accordance with the method of ASTM D 991, at 23° C., 110° C. and 130° C.
(*4)The semiconductive resin composition was measured in accordance with the method of ASTM D 638, at 23° C.
(*5)The semiconductive resin composition was measured in accordance with the method of ASTM D 638, at 150° C. 'Fail' means 'not measurable'.
(*6)A degree of peeling between the semiconductive composition and the insulator (90 parts by weight of the polypropylene-based resin/10 parts by weight of the olefinic elastomer (Suprene S501A)) was measured at a peeling rate of 250 mm/min and a peeling angle of 180° in accordance with the standard of ASTM D 903.
(*7)The number and width of protrusions on the surface of the extruded sheet was measured using continuous magnification observation equipment at X80. The size of protrusion was based on those of 0.05-0.10 mm.
(*8)Warping was determined by observing whether warping occurred after manufacturing a cable, with the naked eye. X: warping, ○: no warping.

What is claimed is:

1. A semiconductive resin composition comprising: 20 to 70 parts by weight of any one or two or more conductive particles selected from the group consisting of carbon black, graphite and graphene, based on 100 parts by weight of a composite resin including a polypropylene homopolymer having a melting point of 150 to 170° C. and an ethylene-(meth)acrylate-based resin, wherein the composite resin further includes 1 to 100 parts by weight of an olefinic elastomer, based on 100 parts by weight of the polypropylene homopolymer.

2. The semiconductive resin composition of claim 1, wherein the composite resin includes 10 to 250 parts by weight of the ethylene-(meth)acrylate-based resin, based on 100 parts by weight of the polypropylene homopolymer.

3. The semiconductive resin composition of claim 1, wherein the polypropylene homopolymer has a melt index of 0.05 to 50 g/10 min, as measured under a condition of 230° C. and 2.16 kg.

4. The semiconductive resin composition of claim 1, wherein the ethylene-(meth)acrylate-based resin has a melt index of 0.1 to 20 g/10 min, as measured under a condition of 190° C. and 2.16 kg.

5. The semiconductive resin composition of claim 4, wherein the ethylene-(meth)acrylate-based resin includes 50 to 99 weight % of a unit derived from an ethylene monomer and 1 to 50 weight % of a unit derived from a (meth) acrylate-based monomer.

6. The semiconductive resin composition of claim 1, wherein the olefinic elastomer is any one or two or more selected from the group consisting of ethylene-propylene-diene-based elastomers and styrene and olefin copolymer-based elastomers.

7. The semiconductive resin composition of claim 1, wherein a blend of the polypropylene homopolymer and the olefinic elastomer has a melt index of 0.1 to 20 g/10 min, as measured under a condition of 230° C. and 2.16 kg.

8. A cable comprising a semiconductive layer manufactured by extruding the semiconductive resin composition of claim 1.

9. A semiconductive resin composition comprising:
20 to 70 parts by weight of any one or two or more conductive particles selected from the group consisting of carbon black, graphite and graphene, based on 100 parts by weight of a composite resin including a polypropylene homopolymer having a melting point of 150 to 170° C. and an ethylene-(meth)acrylate-based resin; and
0.1 to 5 parts by weight of an aliphatic polyamide resin, based on 100 parts by weight of the composite resin.

* * * * *